(12) United States Patent
Iwane et al.

(10) Patent No.: US 9,473,724 B2
(45) Date of Patent: Oct. 18, 2016

(54) IMAGING DEVICE AND IMAGING SYSTEM

(71) Applicant: CANON KABUSHIKI KAISHA, Tokyo (JP)

(72) Inventors: Masaaki Iwane, Sagamihara (JP); Kazuki Ohshitanai, Kawasaki (JP); Akira Okita, Yamato (JP)

(73) Assignee: CANON KABUSHIKI KAISHA, Toyko (JP)

( * ) Notice: Subject to any disclaimer, the term of this patent is extended or adjusted under 35 U.S.C. 154(b) by 0 days.

(21) Appl. No.: 14/606,708

(22) Filed: Jan. 27, 2015

(65) Prior Publication Data
US 2015/0215555 A1      Jul. 30, 2015

(30) Foreign Application Priority Data

Jan. 30, 2014  (JP) ................................ 2014-016023

(51) Int. Cl.
| H04N 5/378 | (2011.01) |
| H04N 5/3745 | (2011.01) |
| H04N 5/347 | (2011.01) |
| H04N 5/76 | (2006.01) |
| H04N 5/376 | (2011.01) |
| H04N 5/77 | (2006.01) |

(52) U.S. Cl.
CPC .............. *H04N 5/378* (2013.01); *H04N 5/347* (2013.01); *H04N 5/3765* (2013.01); *H04N 5/37457* (2013.01); *H04N 5/76* (2013.01); *H04N 5/772* (2013.01)

(58) Field of Classification Search
None
See application file for complete search history.

(56) References Cited

U.S. PATENT DOCUMENTS

| 5,955,753 A * | 9/1999 | Takahashi ......... H01L 27/14609 257/231 |
| 7,456,886 B2 * | 11/2008 | Shinohara .............. H04N 3/155 348/308 |
| 8,158,920 B2 * | 4/2012 | Suzuki ................... H04N 5/343 250/208.1 |
| 2010/0289933 A1 * | 11/2010 | Ryoki .................. H04N 5/3575 348/300 |
| 2014/0036121 A1 | 2/2014 | Minowa et al. |

FOREIGN PATENT DOCUMENTS

| JP | 2004-134867 A | 4/2004 |
| JP | 2009-089367 A | 4/2009 |

\* cited by examiner

*Primary Examiner* — Albert Cutler
(74) *Attorney, Agent, or Firm* — Canon USA, Inc. IP Division

(57) ABSTRACT

There is provided an imaging device. In the imaging device, when a range of the signal amplitude available for a signal output from a pixel cell is small, a period, in which a signal in a buffer unit is output, is set shorter than that when the range is large.

17 Claims, 8 Drawing Sheets

IMAGING DEVICE AND IMAGING SYSTEM

BACKGROUND OF THE INVENTION

1. Field of the Invention

The present invention relates to an imaging device and an imaging system.

2. Description of the Related Art

As an example of a structure for speeding up an imaging device, there is known a structure including a first accumulation unit configured to hold signals output from pixels, a buffer unit configured to transmit the signals held by the first accumulation unit, and a second accumulation unit, to which the signals are transmitted from the buffer unit, as described in Japanese Patent Application Laid-Open No. 2009-089367. In the imaging device of Japanese Patent Application Laid-Open No. 2009-089367, the first accumulation unit first holds a signal of a first pixel. The buffer unit then transmits the signal of the first pixel held in the first accumulation unit to the second accumulation unit. Thereafter, the first accumulation unit holds a signal of a second pixel during a period, in which the signal of the first pixel is read out from the second accumulation unit. Thus, a period, in which the signal of the first pixel is read out from the second accumulation unit, and a period, in which the signal is output from the second pixel to the first accumulation unit, can be superposed. Therefore, speed-up of the imaging device can be realized in comparison to an imaging device having a structure without a second accumulation unit.

Japanese Patent Application Laid-Open No. 2004-134867 describes an imaging device, in which an amplifying element is shared by a plurality of photoelectric conversion unit and configured to output signals based on electric charges accumulated in the photoelectric conversion units to a vertical signal line. The amplifying element then outputs a first signal based on electric charges generated by a first photoelectric conversion unit and a second signal based on electric charges obtained by adding electric charges generated by the first photoelectric conversion unit and electric charges generated by another photoelectric conversion unit.

However, further speed-up of the operation is not considered in Japanese Patent Application Laid-Open No. 2009-089367 or Japanese Patent Application Laid-Open No. 2004-134867.

SUMMARY OF THE INVENTION

An aspect of the invention is an imaging device comprising: a pixel cell including a first photoelectric conversion unit, a second photoelectric conversion unit, and an output unit; and a read-out circuit including a buffer unit configured to buffer a signal output from the output unit, a capacitor element configured to hold a signal output from the buffer unit, and a switching unit configured to switch a state, between the buffer unit and the capacitor element, between a conductive state and a non-conductive state, wherein the output unit outputs the first signal based on electric charges accumulated in the first photoelectric conversion unit, and the buffer unit outputs a first buffer signal obtained by buffering the first signal, the output unit outputs a second signal based on electric charges obtained by adding electric charges accumulated in the first photoelectric conversion unit and electric charges accumulated in the second photoelectric conversion unit, and the buffer unit outputs a second buffer signal obtained by buffering the second signal, and a period, in which the switching unit keeps a path between the buffer unit and the capacitor element in the conductive state to cause the capacitor element to hold the first buffer signal, is shorter than a period, in which the switching unit keeps the electrical path between the buffer unit and the capacitor element in the conductive state to cause the capacitor element to hold the second buffer signal.

Further features of the present invention will become apparent from the following description of exemplary embodiments (with reference to the attached drawings).

DESCRIPTION OF THE EMBODIMENTS

Imaging devices of respective exemplary embodiments will be described below with reference to the accompanying drawings.

(First Exemplary Embodiment)

Figure 1:
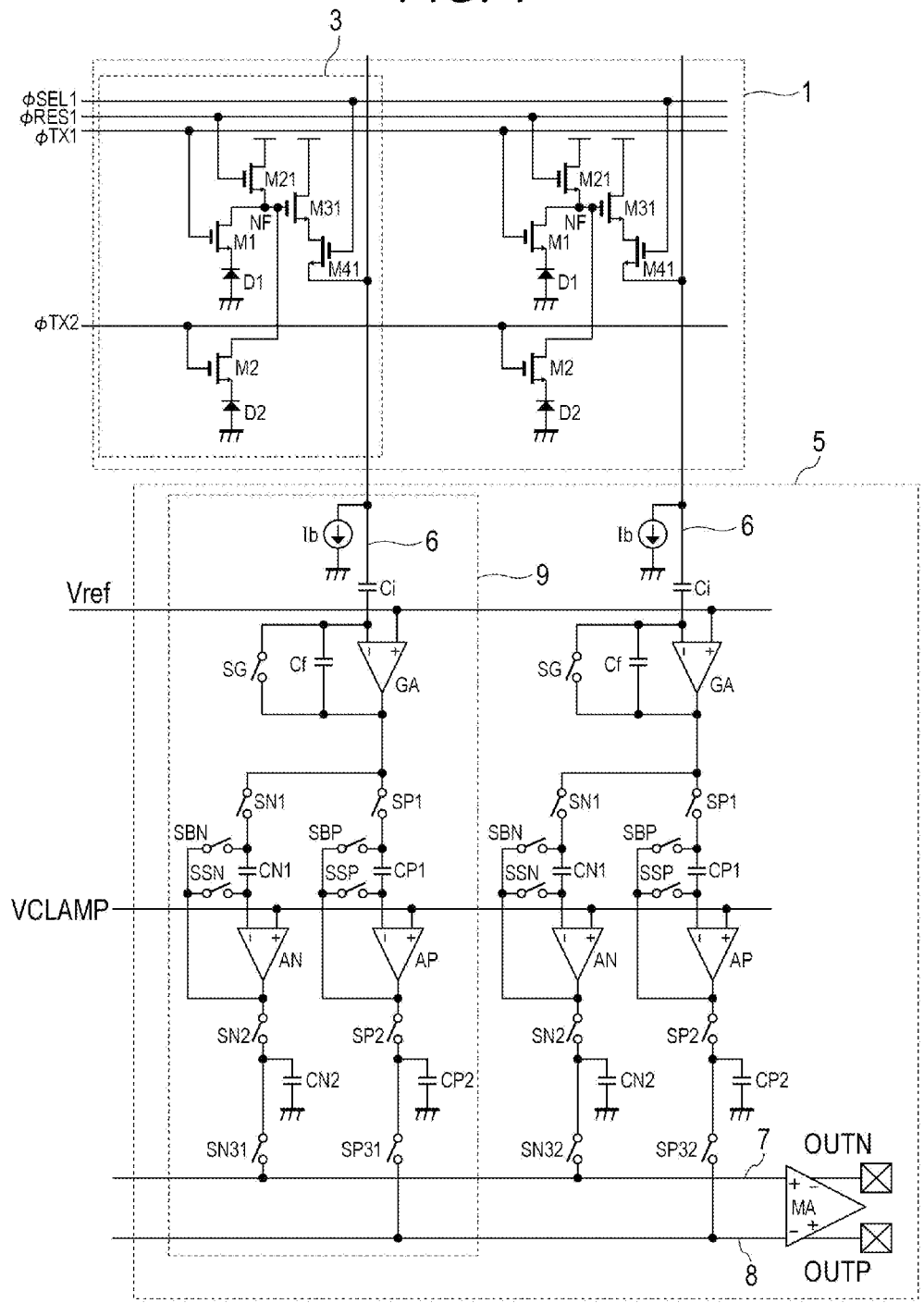
FIG. 1 illustrates an example of a structure of an imaging device.

FIG. 1 illustrates a structure of an imaging device of the present exemplary embodiment.

The imaging device includes a pixel array 1 including pixel cells 3, and a peripheral circuit unit 5 including buffer circuits AP as buffer units. The pixel array 1 includes the plurality of pixel cells 3. Each of the pixel cells 3 includes a photodiode D1, a photodiode D2, a transistor M1, a transistor M2, a transistor M21, a transistor M31, and a transistor M41. The photodiode D1 is a first photoelectric conversion unit included in each of the pixel cells 3. The photodiode D2 is a second photoelectric conversion unit included in each of the pixel cells 3. A node NF is electrically connected to an input node of the transistor M31, one of main nodes of the transistor M21, one of main nodes of the transistor M1, and one of main nodes of the transistor M2. One of the pixel cells 3 includes two pixels: a pixel including the photodiode D1 and a pixel including the photodiode D2. The transistor M31 is an output unit configured to output a signal based on electric charges accumulated in each of the photodiode D1 and the photodiode D2 or a signal based on electric charges obtained by adding electric charges accumulated respectively in the photodiode D1 and the photodiode D2.

The imaging device includes the pixel cells 3 arranged in a two-dimensional array having thousands of rows and thousands of columns. FIG. 1 illustrates pixel cells 3 arranged in an array of one row and two columns as a part of the pixel cells 3 of two-dimensional array. Note that, unless otherwise specifically noted, an indication of X-th row indicates pixel cells 3 in the X-th row from the left of the drawing. An indication of Y-th column similarly indicates pixel cells 3 in the Y-th column from the top of the drawing.

The imaging device further includes the peripheral circuit unit 5 outside the pixel array 1. The peripheral circuit unit 5 includes read-out circuits 9. The transistor M41 in each of the pixel cells 3 is electrically connected to a capacitor element Ci through a vertical signal line 6. A current source Ib supplies current to the transistor M31 through the vertical signal line 6 and the transistor M41. Thus, the current source Ib, the transistor M31, and a voltage source configured to supply voltage to the transistor M31 constitute a source follower circuit.

Each of the read-out circuits 9 includes an amplifier GA, a buffer circuit AN, the buffer circuit AP, the capacitor element Ci, a capacitor element Cf, a capacitor element CN1, a capacitor element CP1, a capacitor element CN2, and a capacitor element CP2. Each of the read-out circuits 9 further includes a switch SG, a switch SN1, a switch SP1, a switch SBN, a switch SBP, a switch SSN, a switch SSP, a switch SN2, a switch SP2, a switch SN31, and a switch SP31. The amplifier GA is an amplification unit configured to output an amplified signal obtained by amplifying a signal output from the output unit of the pixel cells 3. The buffer circuit AP is a buffer unit configured to buffer an amplified signal output from the amplification unit. The buffer circuit AN is a second buffer unit configured to buffer an amplified signal output from the amplification unit. The switch SP2 is a switching unit configured to switch the state of an electrical path between the buffer circuit AP as a buffer unit and the capacitor element CP2 between the conductive state and the non-conductive state. The buffer unit is a circuit configured to convert impedance of the electrical path between the amplification unit and the buffer unit, and impedance of the electrical path between the buffer unit and the following switching unit. The amplification factor of the buffer unit is set to 1. The switch SP1 is a second switching unit configured to switch the state of an electrical path between the amplifier GA as an amplification unit and the capacitor element CP1 between the conductive state and the non-conductive state. The switch SN1 is a third switching unit configured to switch the state of an electrical path between the amplifier GA as an amplification unit and the capacitor element CN1 between the conductive state and the non-conductive state. The switch SN2 is a fourth switching unit configured to switch the state of an electrical path between the buffer circuit AN as a second buffer unit and the capacitor element CN2 between the conductive state and the non-conductive state. The capacitor element CP1 is a second capacitor element to which the amplifier GA outputs an amplified signal when the switch SP1 is in the conductive state. The capacitor element CN1 is a third capacitor element to which the amplifier GA outputs an amplified signal when the switch SN1 is in the conductive state. The capacitor element CN2 is a fourth capacitor element to which the buffer circuit AN outputs a buffer signal when the switch SN2 is in the conductive state.

The capacitor element CP2 and the capacitor element CN2 of the read-out circuits 9 respectively output signals held respectively by the capacitor element CP2 and the capacitor element CN2 to an output amplifier MA respectively through an output line 7 and an output line 8.

Figure 2:
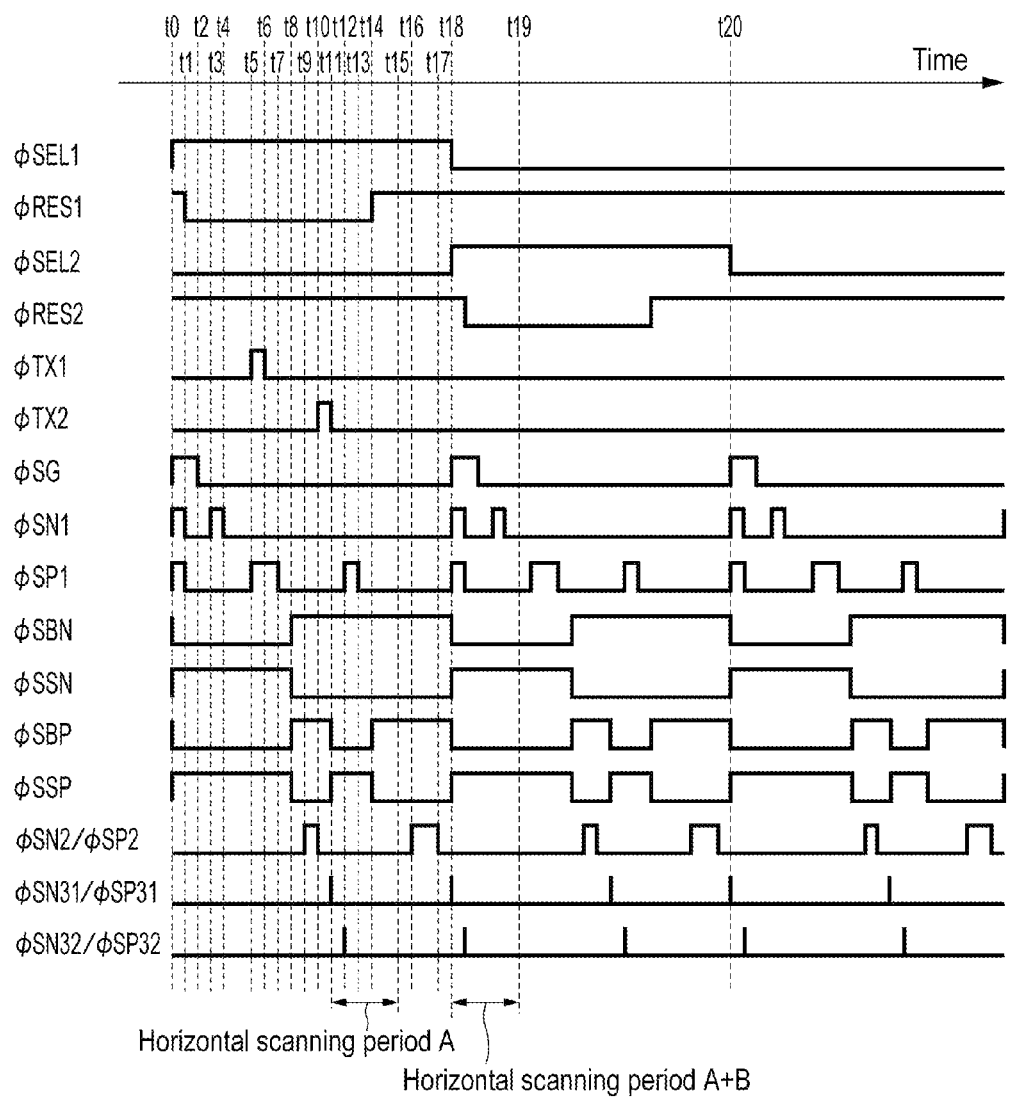
FIG. 2 illustrates an example of operation of the imaging device.

FIG. 2 is a timing diagram illustrating operation of the imaging device illustrated in FIG. 1.

The signals φSEL1, φRES1, φTX1, and φTX2 in FIG. 2 respectively correspond to signals indicated by the reference signs that are identical to those assigned in FIG. 1. The signals φSEL2 and φRES2 are signals for controlling pixel cells 3 in a row adjacent to the pixel cells 3 to which the signal φSEL1 is input.

The signals φSEL1, φRES1, φSEL2, φRES2, φTX1, and φTX2 are signals output from a vertical scan circuit, which is not illustrated. In FIG. 2, the signals for controlling the respective switches included in the read-out circuits 9 in FIG. 1 are indicated by φ followed with the respective reference signs of the switches assigned in FIG. 1. The signal φSG is a signal for controlling the switch SG by a timing generator, which is not illustrated in FIG. 1. When the signal φSG is the High level (hereinafter, referred to as H level), the switch SG is in the conductive state. When the signal φSG is Low level (hereinafter, referred to as L level), the switch SG is in the non-conductive state. When other signals: signal φSN1, signal φSP1, signal φSBP, signal φSSP, signal φSN2, signal φSP2, signal φSN31, signal φSP31, signal φSN32, and signal φSP32 are the H level, the corresponding switches are in the conductive state, and when the signals are the L level, the corresponding switches are in the non-conductive state. Note that the signal φSN2 and the signal φSP2 are in phase with each other. The signal φSN31 and the signal φSP31 are also in phase with each other. The signal φSN32 and the signal φSP32 are also in phase with each other.

At time t1, the vertical scan circuit sets the signal φRES1 to the L level. Thus, the transistors M21 are turned off and the reset of the nodes NF is released. The release of the reset of the nodes NF causes the transistors M31 to output signals to the vertical signal lines 6 through the transistors M41. The signals are referred to as noise signals. The timing generator also sets the signal φSN1 and the signal φSP1 to the L level. Thus, the electrical path between the amplifiers GA and the capacitor elements CN1, and the electrical path between the amplifiers GA and the capacitor elements CP1 respectively become non-conductive. Note that, the vertical scan circuit sets the signal φSEL1 and the signal φRES2 to the H level at time t1. The vertical scan circuit also sets the signal φSEL2, the signal φTX1, and the signal φTX2 to the L level at time t1. The timing generator also sets the signal φSG, the signal φSSN, and the signal φSSP to the H level at time t1. The timing generator also sets the signal φSBN, the signal φSBP, the signal φSN2, the signal φSP2, the signal φSN31, the signal φSP31, the signal φSN32, and the signal φSP32 to the L level at time t1.

The timing generator sets the signal φSG to the L level at time t2. Thus, the switches SG become non-conductive. Each of the amplifiers GA outputs a signal obtained by multiplying an input signal by the amplification factor Ci/Cf where Cf is the capacitance value of the capacitor element Cf and Ci is the capacitance value of the capacitor element Ci. Specifically, the amplifier GA outputs a signal obtained by amplifying a noise signal output to the vertical signal line 6 from the pixel cell 3 (hereinafter, referred to as an amplified noise signal).

At time t3, the timing generator sets the signal φSN1 to the H level. Thus, the switches SN1 become conductive. At the same time, the amplifier GA outputs the amplified noise signal. When the switches SN1 become conductive, a period, in which the amplifiers GA output the amplified noise signals to the capacitor elements CN1, starts.

At time t4, the timing generator sets to the signal φSN1 to L level. Thus, the switches SN1 become non-conductive. Therefore, the capacitor elements CN1 hold the amplified noise signals at this time.

At time t5, the vertical scan circuit sets the signal φTX to the H level. Thus, the transistors M1 start to transfer the electric charges accumulated in the photodiodes D1 to the nodes NF. The timing generator also sets the signal φSP1 to the H level. Thus, a period, in which the amplifiers GA output signals to the capacitor elements CP1, starts.

At time t6, the vertical scan circuit sets the signal φTX to the L level. Thus, the transistors M1 finish transferring the accumulated electric charges in the photodiodes D1 to the nodes NF. The signals output at this time from the transistors M31 to the vertical signal lines 6 through the transistors M41 are referred to as signals A. The signals A are first optical signals based on the electric charges accumulated in the first photoelectric conversion units. Each of the amplifiers GA amplifies the signal A and outputs a signal obtained by the amplification. The obtained signal is referred to as an amplified signal A. The amplified signal A is a first amplified signal obtained by amplifying the first optical signal and output by the amplifier GA.

At time t7, the timing generator sets the signal φSP1 to the L level. Thus, the capacitor elements CP1 hold the amplified signals A at this time.

At time t8, the timing generator sets the signal φSBN to the H level and sets the signal φSSN to the L level. Thus, the switches SBN become conductive and the switches SSN become non-conductive. Therefore, the buffer circuits AN output the amplified noise signals held by the capacitor elements CN1 to the switches SN2. The timing generator also sets the signal φSBP to the H level and sets the signal φSSP to the L level at the same time. Thus, the switches SBP become conductive and the switches SSP become non-conductive. Therefore, the buffer circuits AP output the amplified signals A held by the capacitor elements CP1 to the switches SP2. The signal output from each of the buffer circuits AP is a first buffer signal obtained by buffering the amplified signal A, which is the first amplified signal.

At time t9, the timing generator sets the signal φSN2 and the signal φSP2 to the H level. Thus, a period, in which the buffer circuits AN output the amplified noise signals to the capacitor elements CN2, starts. In addition, a period, in which the buffer circuits AP output the amplified signals A to the capacitor elements CP2, starts.

At time t10, the timing generator sets the signal φSN2 and the signal φSP2 to the L level. Thus, the capacitor elements CN2 hold the amplified noise signals, and the capacitor elements CP2 hold the amplified signals A, which are the first buffer signals.

Then, a horizontal scanning circuit, which is not illustrated, sets the signal φSN31 and the signal φSP31 to the H level. Thus, the capacitor element CN2 included in the read-out circuit 9 related to the pixel cell 3 in the first column in FIG. 1 outputs the amplified noise signal based on the noise signal to the output amplifier MA. In addition, the capacitor element CP2 included in the read-out circuit 9 related to the pixel cell 3 in the first column outputs the amplified signal A based on the electric charges accumulated in the photodiode D1 to the output amplifier MA. The output amplifier MA outputs a difference signal between the amplified signal A and the amplified noise signal to a terminal OUTN and a terminal OUTS. The horizontal scanning circuit then sets the signal φSN32 and the signal φSP32 to the H level. Thus, the read-out circuit 9 in each column outputs the amplified signal A and the amplified noise signal to the output amplifier MA. A period, in which the read-out circuit 9 in each column outputs the amplified signal A and the amplified noise signal to the output amplifier MA, is referred to as a horizontal scanning period A. In FIG. 2, the horizontal scanning period A is from time t11 to time t15.

On the other hand, the vertical scan circuit sets the signal φTX2 to the H level at time t10. The transistors M2 of the pixel cells 3 in a first row start to transfer the electric charges accumulated in the photodiodes D2 to the nodes NF. The nodes NF hold the electric charges accumulated in the photodiodes D1 through the operation described above. The vertical scan circuit sets the signal φTX2 to the L level at time t11, whereby the nodes NF of the pixel cells 3 in the first row hold electric charges obtained by adding the electric charges accumulated in the photodiodes D1 and the electric charges accumulated in the photodiodes D2. The signal output from each of the transistors M31 to the vertical signal line 6 through each of the transistors M41 is referred to as a signal A+B. Meanwhile, the difference signal between the signal A+B and the signal A is a signal B. The signal B is assumed to be obtained when the transistor M31 outputs to the vertical signal line 6 through the transistor M41 based only on the electric charges accumulated in the corresponding photodiode D2. The corresponding amplifier GA amplifies the signal A+B and outputs a signal obtained by the amplification. The obtained signal is referred to as an amplified signal A+B. The amplified signal A+B is a second amplified signal obtained by amplifying the signal A+B.

The timing generator also sets the signal φSBP to the L level and the signal SSP to the H level at time t11. Thus, the capacitor elements CP1 are ready again to hold signals output from the amplifiers GA.

The timing generator sets the signal φSP1 to the H level at time t12, and the timing generator then sets the signal φSP1 to the L level at time t13. This operation causes the capacitor elements CP1 to hold the amplified signals A+B.

The timing generator sets the signal φSBP to the H level and the signal φSSP to the L level at time t14. Thus, the buffer circuits AP output the amplified signals A+B to the switches SP2. The signals output from the buffer circuits AP are second buffer signals obtained by buffering the amplified signals A+B, which are the second amplified signals. Meanwhile, the signal output from each of the buffer circuits AN is a third buffer signal obtained by buffering the amplified noise signal.

The timing generator sets the signal φSN2 and the signal φSP2 to the H level at time t16 after the horizontal scanning period A. Thus, the capacitor elements CN2 hold the amplified noise signals having been held by the capacitor elements CN1. The capacitor elements CP2 also hold the amplified signals A+B.

The horizontal scanning circuit then sets the signal φSN31 and the signal φSP31 to the H level. Thus, the corresponding capacitor element CN1 outputs the amplified noise signal to the output amplifier MA. The corresponding capacitor element CP1 outputs the amplified signal A+B to the output amplifier MA. The output amplifier MA outputs the difference signal between the amplified signal A+B and the amplified noise signal to the terminal OUTS and the terminal OUTN. A period, in which the read-out circuit 9 in each column outputs the amplified signal A+B and the amplified noise signal to the output amplifier MA, is referred to as a horizontal scanning period A+B. In FIG. 2, the A+B horizontal scanning period is from time t18 to time t19.

From time t18, the vertical scan circuit and the timing generator perform operation for obtaining the amplified noise signals, the amplified signals A, and the amplified signals A+B based on the pixel cells 3 in the second row similarly to the period from time t0 to time t18.

In the present exemplary embodiment, a period, in which the signal φSP2 is kept at the H level for the amplified signals A+B, is a period from time t16 to time t17. Meanwhile, a period, in which the signal φSP2 is kept at the H level for the amplified signals A, is a period from time t9 to time t10, which is less than the period from time t16 to time t17. This is because an amplitude range available for the amplified signals A is less than that for the amplified signals A+B. A settling period from the time when each of the buffer circuits AP starts to output a signal to the capacitor elements CP2 to the time when the signal is converged is shorter for the amplified signal A than the amplified signal A+B. Therefore, the output of the buffer circuit AP is settled until the corresponding switch SP2 is switched to the non-conductive state even when the period, in which the switches SP2 are kept in the conductive state to cause the capacitor elements CP2 to hold the amplified signals A, is set shorter than the period, in which the switches SP2 are kept in the conductive state to cause the capacitor elements CP2 to hold the amplified signals A+B. Thus, the signal accuracy of the amplified signals A held by the capacitor elements CP2 is hardly deteriorated. In addition, since the period, in which the switches SP2 are kept in the conductive state to cause the capacitor elements CP2 to hold the amplified signals A, is set shorter than the period, in which the switches SP2 are kept in the conductive state to cause the capacitor elements CP2 to hold the amplified signal A+B, the horizontal scanning period A can be started earlier. Thus, speed-up of the imaging device can be realized while suppressing deterioration of the accuracy of signals output from the imaging device.

In the imaging device of the present exemplary embodiment, the period, in which the switches SP2 are kept in the conductive state to cause the capacitor elements CP2 to hold the amplified signals A, is set to a half or less of the period, in which the switches SP2 are kept in the conductive state to cause the capacitor elements CP2 to hold the amplified signals A+B. This is because the signal amplitude available for the amplified signals A is about a half of the amplitude of the amplified signals A+B. Meanwhile, an example in which two photodiodes are included in each of the pixel cells 3 has been described as the present exemplary embodiment. In an alternate exemplary embodiment, more photodiodes may be included in each of the pixel cells 3. The number of photodiodes included in each of the pixel cells 3 is assumed to be L. Each of the pixel cells 3 outputs a signal based on electric charges obtained by adding electric charges accumulated in respective M photodiodes out of L photodiodes (hereinafter, referred to as a signal M) as a signal corresponding to the signal A described above, where M is less than L. The pixel cell 3 outputs a signal based on electric charges obtained by adding electric charges accumulated in respective L photodiodes (hereinafter, referred to as a signal L) as a signal corresponding to the signal A+B. In such a case, in the imaging device of the present exemplary embodiment, the period, in which the switches SP2 are kept in the conductive state to cause the capacitor elements CP2 to hold the signals based on the signals M, is set to M/L or less of the period, in which the switches SP2 are kept in the conductive state to cause the capacitor elements CP2 to hold the signals based on the signals L.

In the imaging device of the present exemplary embodiment, the period, in which the switches SP1 are kept in the conductive state to cause the capacitor elements CP1 to hold the amplified signals A, may be set shorter than the period, in which the switches SP1 are kept in the conductive state to cause the capacitor elements CP1 to hold the amplified signals A+B. Thus, the imaging device of the present exemplary embodiment can achieve further speed-up of the imaging device.

The imaging device of the present exemplary embodiment may be provided with a microlens common to the photodiode D1 and the photodiode D2. In this case, the imaging device of the present exemplary embodiment can output a focus detecting signal for detecting focus through phase difference detection and an image signal for generating an image. Specifically, in the present exemplary embodiment, the signal for detecting focus is the amplified signal A and the image signal is the amplified signal A+B. An output signal processing unit provided outside the imaging device generates a signal corresponding to the amplified signal B, which is a difference signal between the amplified signal A and the amplified signal A+B input from the imaging device. The output signal processing unit then detects phase difference using the signal corresponding to the amplified signal B and the amplified signal A. The output signal processing unit can detect whether the imaging device is focused based on the detected phase difference. The output signal processing unit also generates an image using the amplified signal A+B.

Since the signal accuracy required for the focus detecting signal is a signal accuracy enough to allow for focus detection, the focus detecting signal can allow more deterioration of signal accuracy compared to the image signal. Thus, even if the signal accuracy of the amplified signal A is deteriorated by setting the period, in which the switch SP2 is kept in the conductive state to cause the capacitor element CP2 to hold the amplified signal A, short as the present exemplary embodiment, the accuracy of focus detection is hardly affected. Therefore, speed-up of the imaging device can be realized while suppressing deterioration of the accuracy of focus detection.

Meanwhile, the imaging device of the present exemplary embodiment includes the amplifiers GA configured to amplify signals output from the pixel cells 3. The imaging device of the present exemplary embodiment does not necessarily include the amplifiers GA as long as each of the read-out circuits 9 includes the buffer circuit AP configured to buffer the signal output from the pixel cell 3, the switch SP2, and the capacitor element CP2.

(Second Exemplary Embodiment)

An imaging device of the present exemplary embodiment will be described especially focusing on a difference from the first exemplary embodiment with reference to the drawings.

Figure 3:
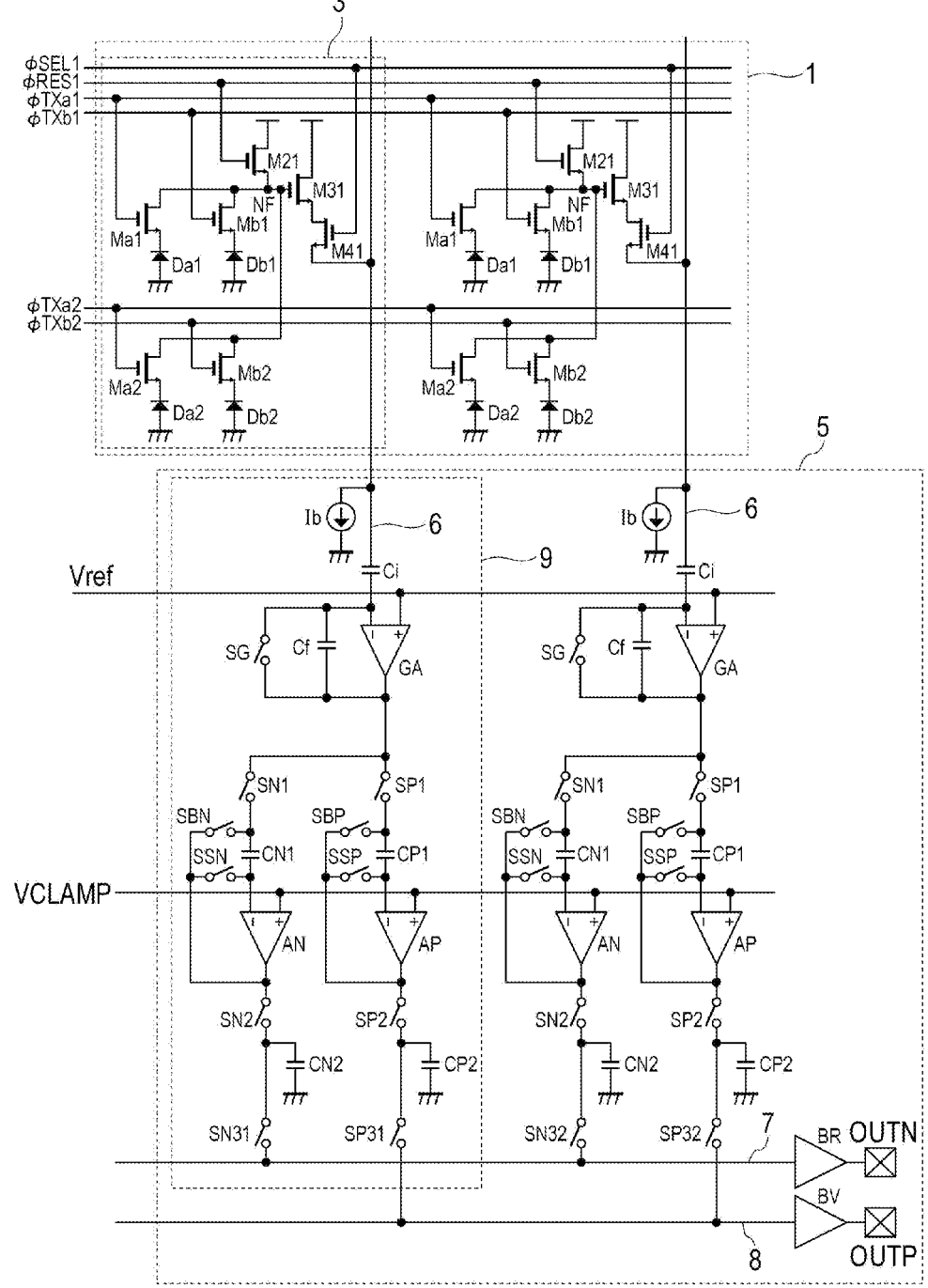
FIG. 3 illustrates an example of a structure of an imaging device.

FIG. 3 illustrates the structure of the imaging device of the present exemplary embodiment. In FIG. 3, elements having functions similar to those illustrated in FIG. 1 are indicated by reference signs identical to those provided in FIG. 1. Each of the pixel cells 3 includes four photodiodes: a photodiode Da1, a photodiode Db1, a photodiode Da2, and a photodiode Db2. The photodiode Da1 is electrically connected to the node NF through a transistor Ma1. Similarly, the photodiode Db1, the photodiode Da2, and the photodiode Db2 are electrically connected to the node NF respectively through a transistor Mb1, a transistor Ma2, and a transistor Mb2.

In the imaging device of the present exemplary embodiment, amplified noise signals output to the output line 7 from the capacitor elements CN2 of the respective columns are input to a first output amplifier BR. The first output amplifier BR outputs the input amplified noise signals to the terminal OUTN. Meanwhile, signals output to the output line 8 from the capacitor elements CP2 of the respective columns are input to a second output amplifier BV. The second output amplifier BV outputs the input signals to the terminal OUTS.

Figure 4:
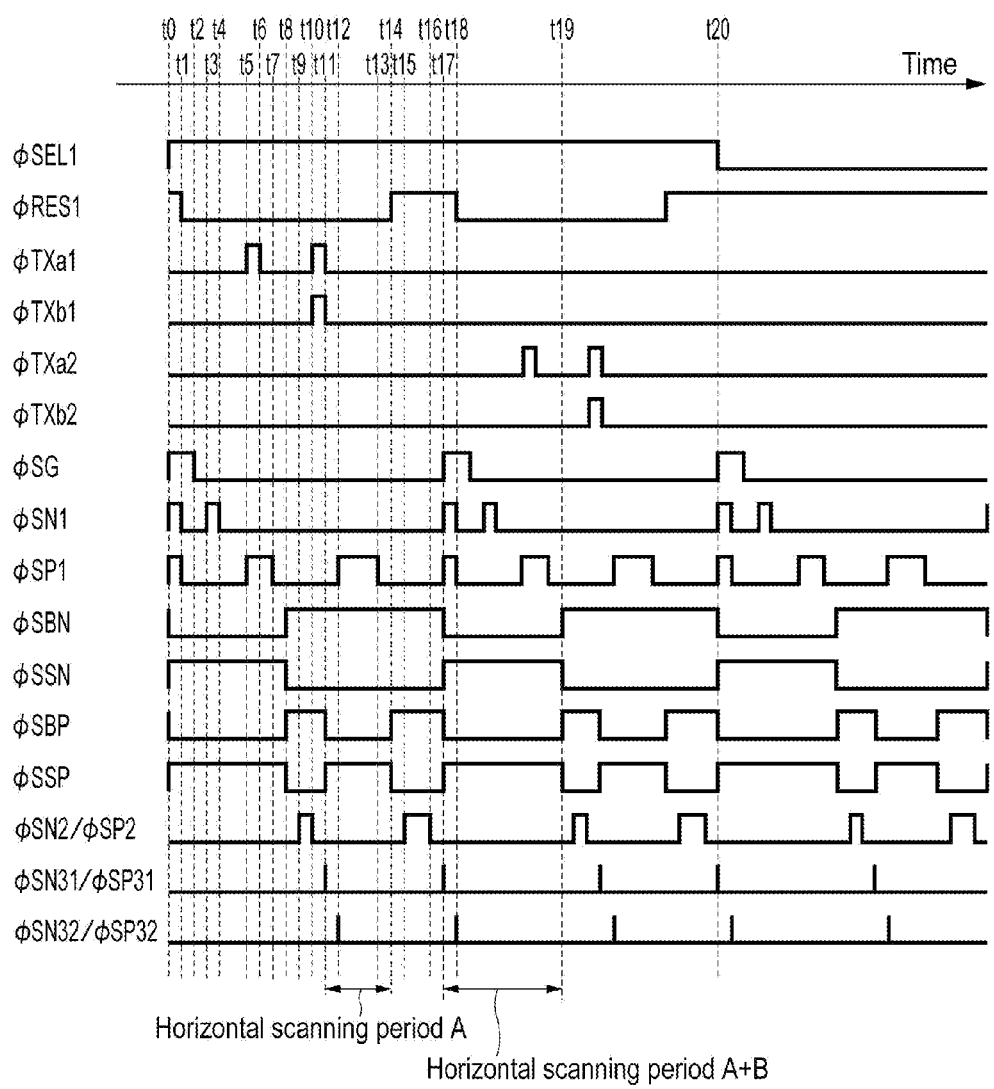
FIG. 4 illustrates an example of operation of the imaging device.

FIG. 4 is a timing diagram illustrating operation of the imaging device illustrated in FIG. 3. In FIG. 4, signals for driving elements that are identical to those in FIG. 2 are indicated by the reference signs that are identical to those assigned in FIG. 2.

A signal φTXa1, a signal φTXb1, a signal φTXa2, and a signal φTXb2 illustrated in FIG. 4 respectively correspond to signals indicated by the reference signs in FIG. 3.

At time t5, the vertical scan circuit sets the signal φTXa1 to the H level. Thus, the transistors Ma1 start to transfer the electric charges accumulated in the photodiodes Da1 to the nodes NF. At the same time, the timing generator sets the signal φSP1 to the H level. Thus, the capacitor elements CP1 start to hold the signals output from the amplifiers GA.

At time t6, the vertical scan circuit sets the signal φTXa1 to the L level. Thus, the transistors Ma1 finish transferring the accumulated electric charges in the photodiodes Da1 to the nodes NF. The signals output at this time from the transistors M31 to the vertical signal lines 6 are the signals A. The amplifiers GA output the amplified signals A obtained by amplifying the signals A to the capacitor elements CP1.

At time t7, the timing generator sets the signal φSP1 to the L level. Thus, the capacitor elements CP1 hold the amplified signals A.

At time t9, the timing generator sets the signal φSN2 and the signal φSP2 to the H level. Thus, a period, in which the buffer circuits AN output the amplified noise signals to the capacitor elements CN2, starts. In addition, a period, in which the buffer circuits AP output the amplified signals A to the capacitor elements CP2, starts.

At time t10, the timing generator sets the signal φSN2 and the signal φSP2 to the L level. Thus, the capacitor elements CN2 hold the amplified noise signals. The capacitor elements CP2 hold the amplified signals A.

At time t10, the vertical scan circuit sets the signal φTXa1 and the signal φTXb1 to the H level. Thus, the transistors Mb1 start to transfer the electric charges accumulated in the photodiodes Db1 to the nodes NF. The transistors Ma1 start to transfer the electric charges accumulated in the photodiodes Da1 from time t6 to the nodes NF.

At time t11, the vertical scan circuit sets the signal φTXa1 and the signal φTXb1 to the L level. Thus, the nodes NF hold electric charges obtained by adding the electric charges accumulated in the photodiodes Da1 and the electric charges accumulated in the photodiodes Db1. Signals output from the transistors M31 to the vertical signal lines 6 through the transistors M41 are the signals A+B. The amplifiers GA outputs the amplified signals A+B obtained by amplifying the signal A+B to the switches SP1.

At time t12, the timing generator sets the signal φSP1 to the H level. Thus, a period, in which the amplifiers GA output the amplified signals A+B to the capacitor elements CP1, starts.

At time t13, the timing generator sets the signal φSP1 to the L level. Thus, the capacitor elements CP1 hold the amplified signals A+B.

At time t15, the timing generator sets the signal φSN2 and the signal φSP2 to the H level. Thus, a period, in which, the buffer circuits AN output the amplified noise signals to the capacitor elements CN2, starts. In addition, a period, in which the buffer circuits AP output the amplified signals A+B to the capacitor elements CP2, starts.

At time t16, the timing generator sets the signal φSN2 and the signal φSP2 to the L level. Thus, the capacitor elements CN2 hold the amplified noise signals. The capacitor elements CP2 hold the amplified signals A+B.

From time t18, the vertical scan circuit and the timing generator perform operation for outputting the amplified signals A based on the electric charges accumulated in the photodiodes Da2 outside the imaging device. The vertical scan circuit and the timing generator also perform operation for outputting the amplified signals A+B based on the electric charges obtained by adding the electric charges accumulated in the photodiodes Da2 and the electric charges accumulated in the photodiodes Db2 outside the imaging device. The vertical scan circuit and the timing generator also perform operation for outputting the amplified noise signals based on the noise signals of the pixel cells 3 to the outside of the imaging device.

In the imaging device of the present exemplary embodiment, similarly to the first exemplary embodiment, a period, in which the switches SP2 are kept in the conductive state to cause the capacitor elements CP2 to hold the amplified signals A, is set shorter than the period, in which the switches SP2 are kept in the conductive state to cause the capacitor elements CP2 to hold the amplified signals A+B. Thus, speed-up of the imaging device can be realized while suppressing deterioration of the accuracy of signals output from the imaging device.

The imaging device of the present exemplary embodiment may be provided with a microlens common to the photodiode Da1 and the photodiode Db1. The imaging device of the present exemplary embodiment may be provided with a microlens common to the photodiode Da2 and the photodiode Db2. Thus, focus detection through phase difference detecting and image generation are possible using the amplified signal A based on the electric charges accumulated in the photodiode Da1 and the amplified signal A+B based on the sum of the electric charges accumulated in the photodiode Da1 and the electric charges accumulated in the photodiode Db1.

The imaging device of the present exemplary embodiment may be provided with a microlens common to the photodiode Da1, the photodiode Db1, the photodiode Da2, and the photodiode Db2. In this case, the imaging device outputs a first amplified signal A+B based on the electric charges obtained by adding the electric charges accumulated respectively in the photodiode Da1 and the photodiode Db1 to the output signal processing unit outside the imaging device. The imaging device then outputs a second amplified signal A+B based on the electric charges obtained by adding the electric charges accumulated respectively in the photodiode Da2 and the photodiode Db2 to the output signal processing unit. The output signal processing unit generates an image based on a signal obtained by adding the first amplified signal A+B and the second amplified signal A+B. Meanwhile, focus detection through phase difference detection can be performed using any of the combinations (1) to (6) described below, for example. Note that the amplified signal B described below is a signal obtained by the output signal processing unit by subtracting the amplified signal A from the amplified signal A+B.

(1) The amplified signal A based on the electric charges in the photodiode Da1 and the amplified signal B based on the electric charges in the photodiode Db1

(2) The amplified signal A based on the electric charges in the photodiode Da1 and the amplified signal B based on the electric charges in the photodiode Db2

(3) The amplified signal A based on the electric charges in the photodiode Da1 and the amplified signal A based on the electric charges in the photodiode Da2

(4) The amplified signal A based on the electric charges in the photodiode Da2 and the amplified signal B based on the electric charges in the photodiode Db1

(5) A signal obtained by adding the amplified signal A based on the electric charges in the photodiode Da1 and the amplified signal A based on the electric charges in the photodiode Da2, and a signal obtained by adding the amplified signal B based on the electric charges in the photodiode Db1 and the amplified signal B based on the electric charges in the photodiode Db2

(6) A signal obtained by adding the amplified signal A based on the electric charges in the photodiode Da1 and the amplified signal B based on the electric charges in the photodiode Db1, and a signal obtained by adding the amplified signal A based on the electric charges in the photodiode Da2 and the amplified signal B based on the electric charges in the photodiode Db2

(7) The amplified signal B based on the electric charges in the photodiode Db1 and the amplified signal B based on the electric charges in the photodiode Db2

(8) The amplified signal A based on the electric charges in the photodiode Da2 and the amplified signal B based on the electric charges in the photodiode Db2

(9) The first amplified signal A+B and the second amplified signal A+B

In addition, in the imaging device of the present exemplary embodiment, the period, in which the switches SP1 are kept in the conductive state to cause the capacitor elements CP1 to hold the amplified signals A, may be set shorter than the period, in which the switches SP1 are kept in the conductive state to cause the capacitor elements CP1 to hold the amplified signal A+B. Thus, the imaging device of the present exemplary embodiment can achieve further speed-up of the imaging device while suppressing deterioration of the accuracy of signals output from the imaging device.

Depending on imaging scenes, focus may be detected using a focus detecting signals of pixels of a part of columns in the pixel array 1. In this case, the read-out circuits 9 in the part of columns of the pixel array 1 output the amplified signals A. In addition, the read-out circuits 9 including the read-out circuits 9 of the part of columns output the amplified signals A+B. In this case, the horizontal scanning period A may be set shorter than the horizontal scanning period A+B. Thus, the imaging device of the present exemplary embodiment can achieve further speed-up of the imaging device.

(Third Exemplary Embodiment)

An imaging device of the present exemplary embodiment will be described especially focusing on the differences from the second exemplary embodiment. The structure of the imaging device of the present exemplary embodiment is identical to that of the second exemplary embodiment illustrated in FIG. 3. The imaging device of the present exemplary embodiment is different from the second exemplary embodiment in that the period, in which the switches SP1 are kept in the conductive state to cause the capacitor elements CP1 to hold the amplified signals A+B, is set equal to or shorter than the period, in which the switches SP1 are kept in the conductive state to cause the capacitor elements CP1 to hold the amplified signals A.

Figure 5:
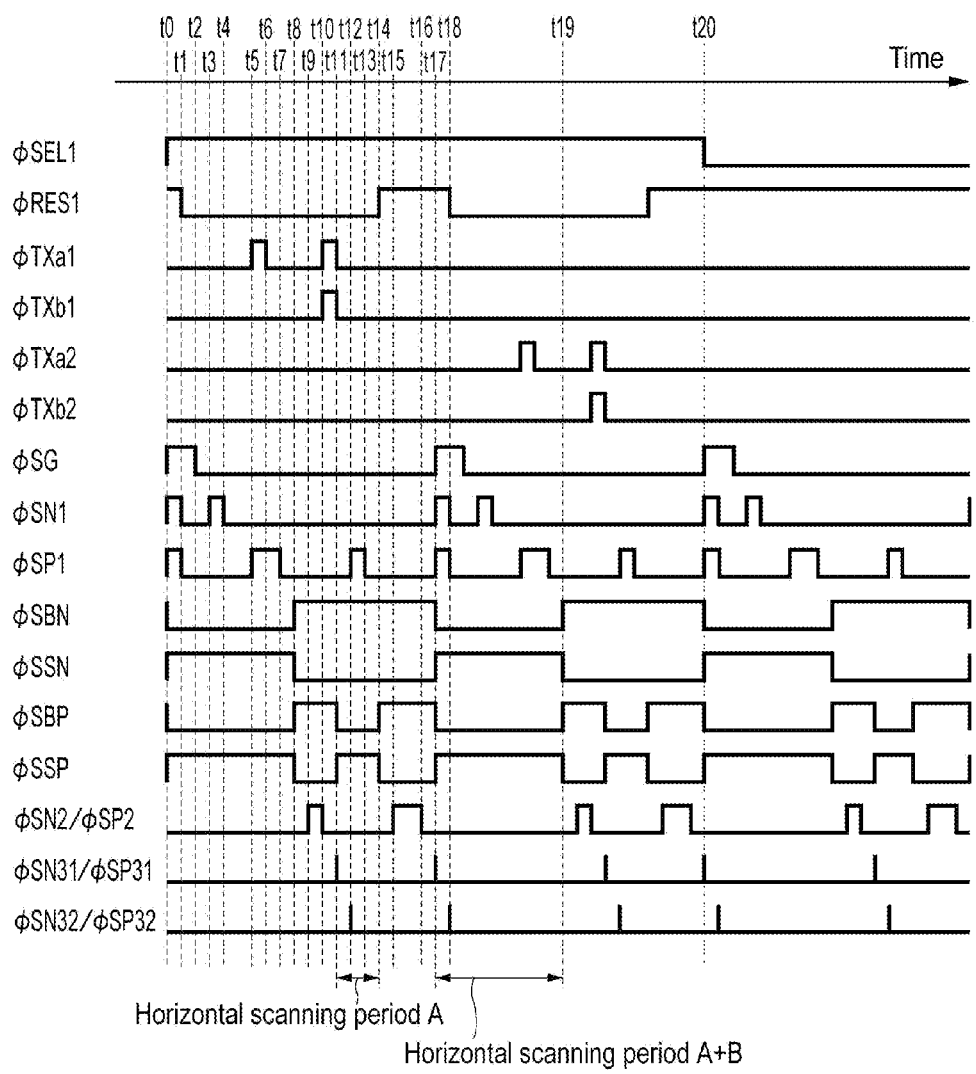
FIG. 5 illustrates an example of operation of the imaging device.

FIG. 5 is a timing diagram illustrating operation of the imaging device of the present exemplary embodiment.

The timing generator keeps the signal φSP1 at the H level from time t5 to time t7. The timing generator sets the signal φSP1 to the L level at time t7, which causes the capacitor elements CP1 to hold the amplified signals A.

Thereafter, the timing generator keeps the signal φSBP at the H level during a period from time t8 to time t11 and keeps the signal φSBP at the L level during a period from time t11 to time t14. The timing generator also keeps the signal φSSP at the L level during the period from time t8 to time t11 and at the H level during the period from time t11 to time t14.

The timing generator keeps the signal φSP1 at the H level during a period from time t12 to time t13, which is within the period, in which the signal φSBP is kept at the L level and the signal φSSP is kept at the H level. The period from time t12 to time t13 is shorter than the period from time t5 to time t7.

The amplitude range of the amplified signals A+B is larger than the amplitude range of the amplified signals A. However, the capacitor elements CP1 already hold the amplified signals A at time t7. In the imaging device of the present exemplary embodiment, the capacitor elements CP1 hold the amplified signals A+B without resetting the amplified signals A having been held in the capacitor elements CP1. Thus, a period, in which the switches SP1 are kept in the conductive state to cause the capacitor elements CP1 to hold the amplified signals A+B, can be set to a period enough for the capacitor elements CP1 to hold difference signals between the amplified signals A+B and the amplified signals A. Therefore, the period from time t12 to time t13 can be set equal to or shorter than the period from time t5 to time t7.

Thus, in the imaging device of the present exemplary embodiment, a period necessary for the capacitor elements CP1 to hold the amplified signals A+B can be shorter than the imaging device of the second exemplary embodiment. Thus, the imaging device can achieve further speed-up.

(Fourth Exemplary Embodiment)

An imaging device of the present exemplary embodiment will be described especially focusing on a difference from the first exemplary embodiment. In the imaging device of the present exemplary embodiment, the structure and operation of the read-out circuits 9 differs from those of the first exemplary embodiment.

Figure 6:
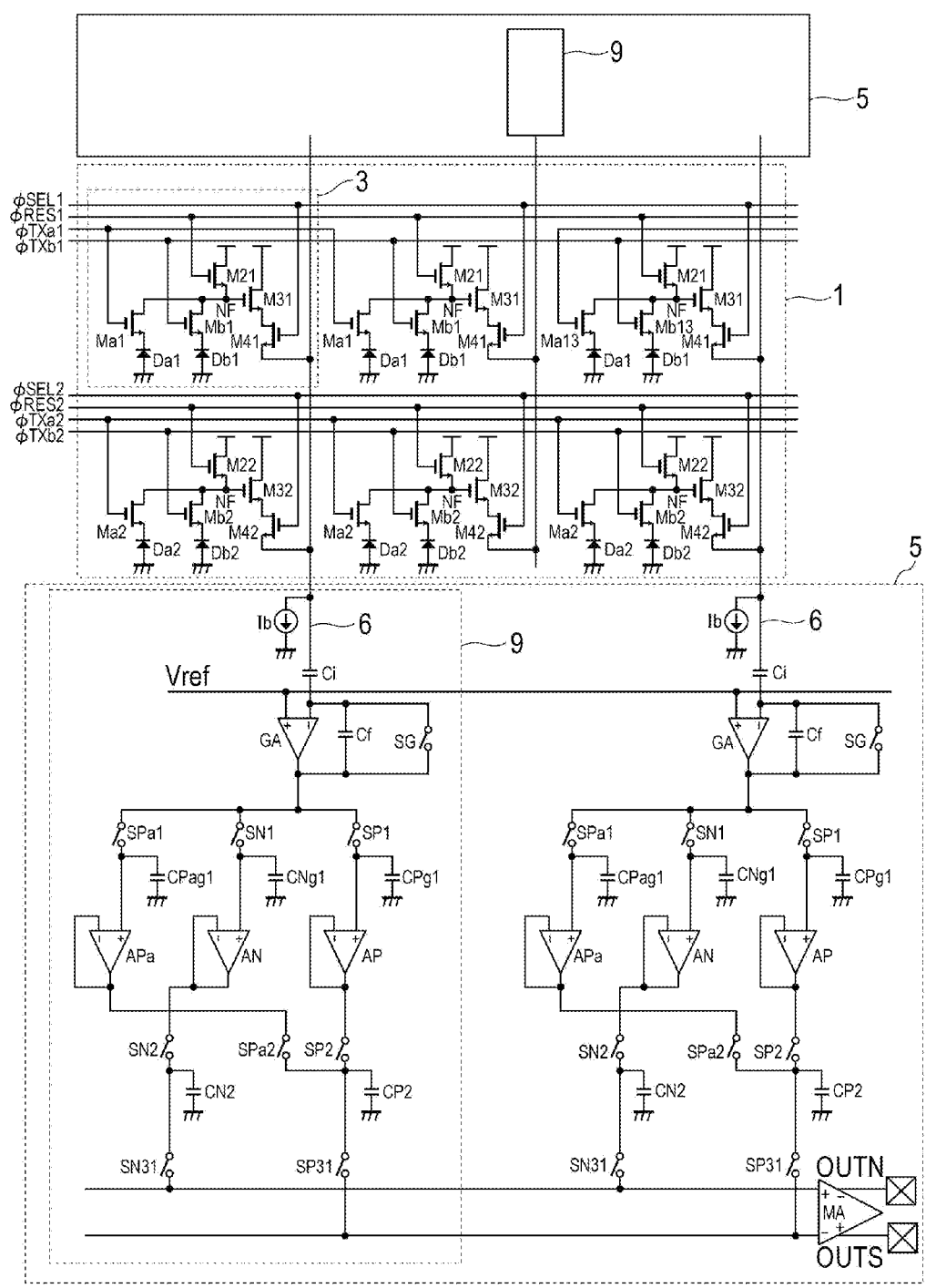
FIG. 6 illustrates an example of a structure of an imaging device.

FIG. 6 illustrates the structure of the imaging device of the present exemplary embodiment. In FIG. 6, elements having functions similar to those illustrated in FIG. 1 are indicated by reference signs identical to those provided in FIG. 1. In the imaging device of the present exemplary embodiment, the peripheral circuit unit 5 is on both sides interposing the pixel array 1.

Each of the read-out circuits 9 of the present exemplary embodiment includes a buffer circuit APa in addition to the buffer circuit AP and the buffer circuit AN. The read-out circuit 9 of the present exemplary embodiment includes a capacitor element CPg1 instead of the capacitor element CP1. The read-out circuit 9 of the present exemplary embodiment also includes a capacitor element CNg1 instead of the capacitor element CN1. The read-out circuit 9 of the present exemplary embodiment further includes a capacitor element CPag1 and a switch SPa2.

Figure 7:
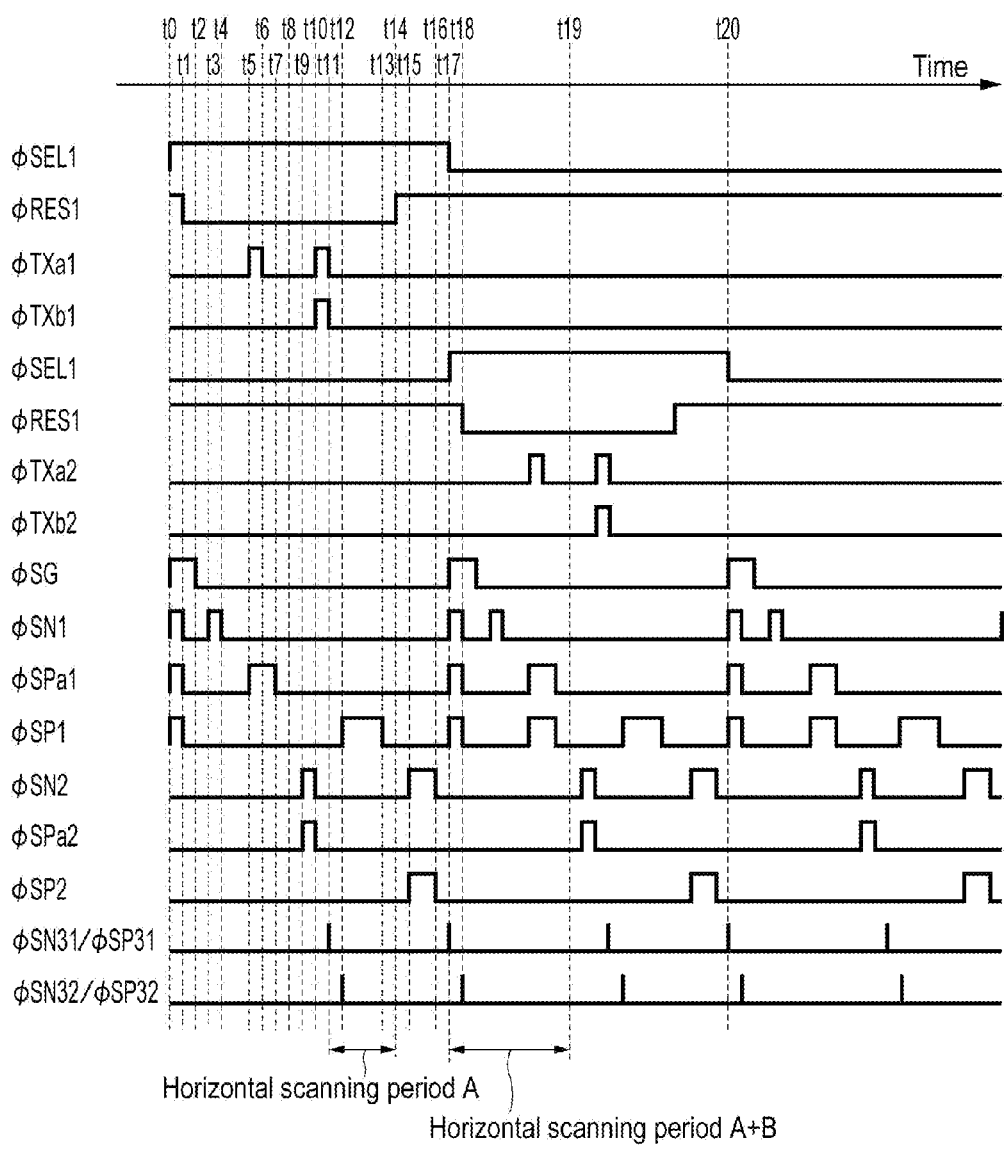
FIG. 7 illustrates an example of operation of the imaging device.

FIG. 7 is a timing diagram illustrating operation of the imaging device illustrated in FIG. 6. A signal φSPa1 illustrated in FIG. 7 is for controlling switches SPa1, and a signal φSPa2 is for controlling switches SPa2.

At time t5, the timing generator sets the signal φSPa1 to the H level. Thus, a period, in which the amplifiers GA output the amplified signals A to the capacitor elements CPag1, starts. The timing generator then sets the signal φSPa1 to the L level at time t6. Thus, the capacitor elements CPag1 hold the amplified signals A.

The timing generator sets the signal φSN2 and the signal φSPa2 to the H level at time t9. Thus, a period, in which the buffer circuits AN outputs the amplified noise signals to the capacitor elements CN2, starts. In addition, a period, in which the buffer circuits AP output the amplified signals A to the capacitor elements CP2, starts.

At time t10, the timing generator sets the signal φSN2 and the signal φSPa2 to the L level. Thus, the capacitor elements CN2 hold the amplified noise signals. The capacitor elements CP2 hold the amplified signals A.

At time t12, the timing generator sets the signal φSP1 to the H level. Thus, a period, in which the amplifiers GA output the amplified signals A+B to the capacitor elements CPg1, starts.

At time t13, the timing generator sets the signal φSP1 to the L level. Thus, the capacitor elements CPg1 hold the amplified signals A+B.

At time t15, the timing generator sets the signal φSN2 and the signal φSP2 to the H level. Thus, a period, in which the buffer circuits AN output the amplified noise signals to the capacitor elements CN2, starts. In addition, a period, in which, the buffer circuits AP output the amplified signals A+B to the capacitor elements CP2, starts.

At time t16, the timing generator sets the signal φSN2 and the signal φSP2 to the L level. Thus, the capacitor elements CN2 hold the amplified noise signals. The capacitor elements CP2 hold the amplified signals A+B.

A period, in which the switches SP2 are kept in the conductive state to cause the capacitor elements CP2 to hold the amplified signals A, is from time t9 to time t10. A period, in which the switches SP2 are kept in the conductive state to cause the capacitor elements CP2 to hold the amplified signals A+B, is from time t15 to time t16. In the imaging device of the present exemplary embodiment, a period, in which the switches SP2 are kept in the conductive state to cause the capacitor elements CP2 to hold the amplified signals A, is set shorter than the period, in which the switches SP2 are kept in the conductive state to cause the capacitor elements CP2 to hold the amplified signals A+B. Thus, the imaging device of the present exemplary embodiment can provide an effect similar to that of the first exemplary embodiment.

(Fifth Exemplary Embodiment)

Figure 8:
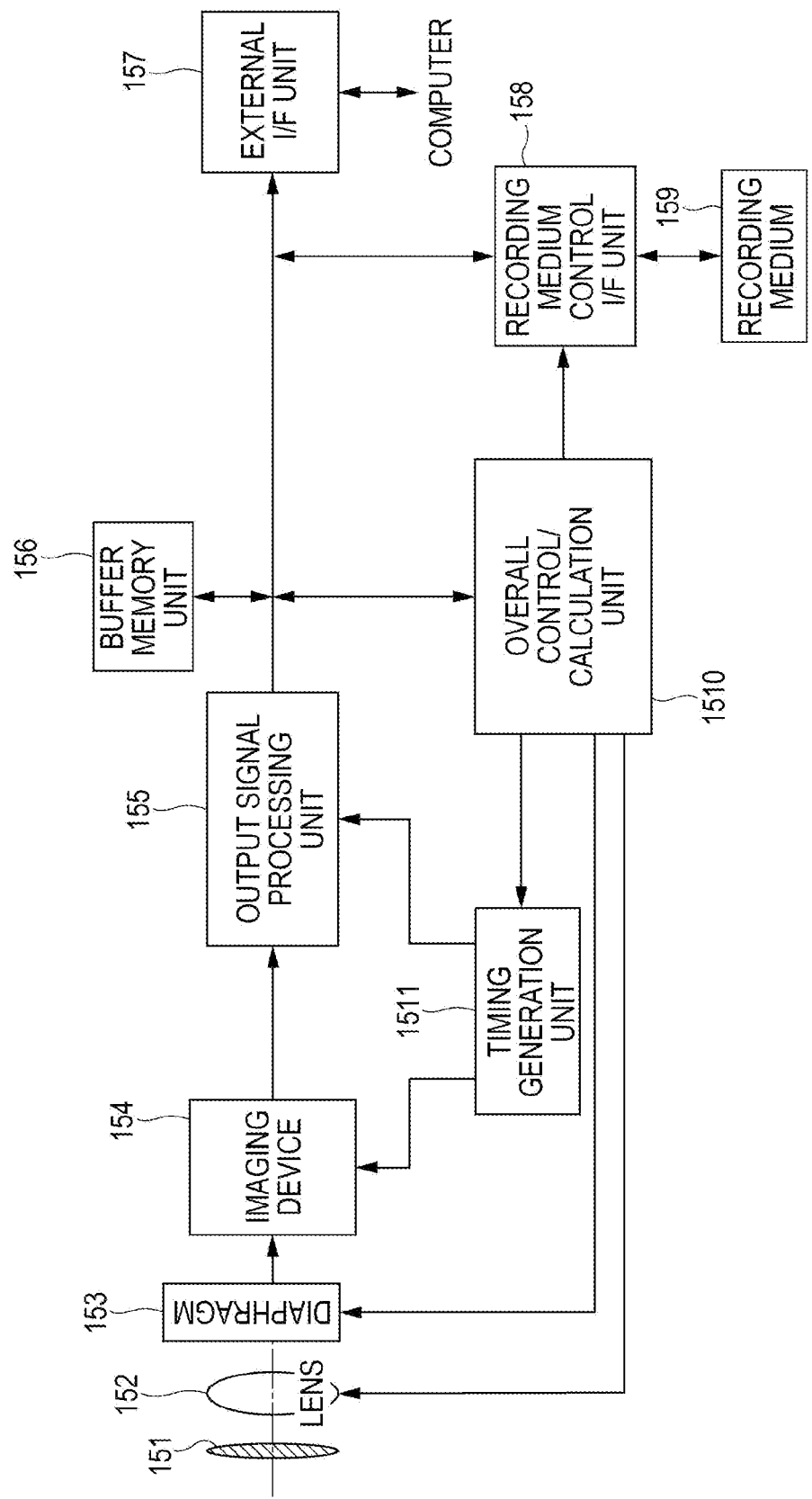
FIG. 8 illustrates an example of a structure of an imaging system.

An exemplary embodiment of an imaging system to which any of the imaging devices described in the first to fourth exemplary embodiments is applied will be described. Examples of an imaging system include a digital still camera, a digital camcorder, and a monitoring camera. FIG. 8 is a schematic diagram of a digital still camera to which an imaging device is applied is described as an example of an imaging system.

The imaging system illustrated in FIG. 8 includes a barrier 151 for protecting a lens, a lens 152 for focusing an optical image of an object on the imaging device 154, and a diaphragm 153 for changing an amount of light passing through the lens 152. The lens 152 and the diaphragm 153 constitute an optical system configured to condense light to the imaging device 154. The imaging system illustrated in FIG. 8 also includes an output signal processing unit 155 configured to process output signals output from the imaging device 154.

The output signal processing unit 155 converts the signals output from the imaging device 154 into digital signals, i.e. performs AD conversion. The imaging device 154 of any of the first exemplary embodiment, the third exemplary embodiment, and the fourth exemplary embodiment outputs a difference signal between the amplified signal A and the amplified noise signal (hereinafter, referred to as an amplified signal A-N) and a difference signal between the amplified signal A+B and the amplified noise signal (hereinafter, referred to as an amplified signal A+B-N). In this case, the output signal processing unit 155 converts the amplified signal A-N and the amplified signal A+B-N respectively to digital signals. Hereinafter, the amplified signal A-N after digitalization is referred to as a digital signal A, and the amplified signal A+B-N after digitalization is referred to as a digital signal A+B.

The imaging device 154 of the second exemplary embodiment outputs the amplified signal A, the amplified signal A+B, and the amplified noise signal. The output signal processing unit 155 converts the amplified signal A, the amplified signal A+B, and the amplified noise signal respectively to digital signals. The output signal processing unit 155 then obtains a difference signal between the digitalized amplified signal A and the digitalized amplified noise signal. The difference signal corresponds to the digital signal A described above. The output signal processing unit 155 generates a difference signal between the digitalized amplified signal A+B and the digitalized amplified noise signal. The difference signal corresponds to the digital signal A+B described above. The digital signal A is obtained by reducing noise component included in the amplified signal A. The digital signal A+B is obtained by reducing noise component included in the amplified signal A+B.

In addition, the output signal processing unit 155 outputs the signal after performing various corrections and compressions as necessary.

The imaging system illustrated in FIG. 8 also includes a buffer memory unit 156 configured to store image data temporarily, and an external interface unit 157 configured to communicate with an external computer or the like. The imaging system also includes a recording medium 159, which is detachably mounted, such as a semiconductor memory to/from which imaging data is stored/read, and a recording medium control interface unit 158 configured to store/read imaging data to/from the recording medium 159. A solid-state image sensing system further includes an overall control/calculation unit 1510 configured to perform various calculation and control overall digital still camera, and a timing generation unit 1511 configured to output various timing signals to the imaging device 154 and the output signal processing unit 155. Note that, timing signals and the like may be input from the outside, and the imaging system is to include at least the imaging device 154 and the output signal processing unit 155 configured to process output signals output from the imaging device 154.

The output signal processing unit 155 generates a signal obtained by subtracting the digital signal A from the digital signal A+B. The signal to be generated corresponds to a digitalized signal of a signal obtained by subtracting the amplified signal A from the amplified signal A+B. The signal to be generated is hereinafter referred to as a digital signal B. The subtraction of the digital the signal A from the digital signal A+B is performed between signals based on photodiodes provided with a common microlens. The output signal processing unit 155 performs focus detection of a phase difference detection using the digital signal A and the digital signal B. The output signal processing unit 155 generates an image using the digital signal A+B.

As described above, the imaging system of the present exemplary embodiment can perform focus detecting operation and imaging operation by applying the imaging device 154.

The output signal processing unit 155 of the present exemplary embodiment generates a digital signal based on the signal B through digital subtraction for subtracting the digital signal A from the digital signal A+B. In another example, the output signal processing unit 155 generates the amplified signal B by subtracting the amplified signal A from the amplified signal A+B. The output signal processing unit 155 then converts the amplified signal B to a digital signal so as to obtain the digital signal B.

The above-described exemplary embodiments merely provides examples for embodying the present invention and the technical scope of the present invention should not be restrictively interpreted based on the exemplary embodiments. Specifically, the present invention can be embodied in various forms without departing from the technical idea or the main feature of the present invention. In addition, the exemplary embodiments described above can be embodied in various combinations.

The present invention can realize speed-up of signal output of an imaging device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-016023, filed Jan. 30, 2014, which is hereby incorporated by reference herein in its entirety.

What is claimed is:

1. An imaging device comprising:
   a pixel cell including a first photoelectric conversion unit, a second photoelectric conversion unit, and an output unit; and
   a read-out circuit including an amplification unit and a buffer unit, the amplification unit configured to amplify a signal based on a signal output from the output unit, and to output an amplified signal to the buffer unit, and the buffer unit configured to buffer a signal output from the amplification unit, a capacitor element configured to hold a signal output from the buffer unit, and a switching unit configured to switch a state, between the buffer unit and the capacitor element, between a conductive state and a non-conductive state, wherein
   the output unit outputs a first signal based on electric charges accumulated in the first photoelectric conversion unit, the amplification unit outputs a first amplified signal obtained by amplifying a signal based on the first signal, and the buffer unit outputs a first buffer signal obtained by buffering a signal based on the first amplified signal,
   the output unit outputs a second signal based on electric charges obtained by adding electric charges accumulated in the first photoelectric conversion unit and electric charges accumulated in the second photoelectric conversion unit, the amplification unit outputs a second amplified signal obtained by amplifying a signal based on the second signal, and the buffer unit outputs a second buffer signal obtained by buffering a signal based on the second amplified signal, and
   a period, in which the switching unit keeps a path between the buffer unit and the capacitor element in the conductive state to cause the capacitor element to hold the first buffer signal, is shorter than a period, in which the switching unit keeps the electrical path between the buffer unit and the capacitor element in the conductive state to cause the capacitor element to hold the second buffer signal.

2. The imaging device according to claim 1, wherein
   the read-out circuit further includes a second capacitor element configured to hold the amplified signal, and a second switching unit configured to switch a state of a path, between the amplification unit and the second capacitor element, between the conductive state and the non-conductive state, and
   a period, in which the second switching unit keeps the path between the amplification unit and the second capacitor element in the conductive state, when the amplification unit outputs the first amplified signal is shorter than a period, in which the second switching unit keeps the path between the amplification unit and the second capacitor element in the conductive state, when the amplification unit outputs the second amplified signal.

3. The imaging device according to claim 1, wherein
   the read-out circuit further includes a third capacitor element configured to hold the amplified signal and a third switching unit configured to switch a state of a path, between the amplification unit and the third capacitor element, between the conductive state and the non-conductive state,
   the output unit further outputs a noise signal,
   the amplification unit outputs an amplified noise signal obtained by amplifying the noise signal, and
   a period, in which the third switching unit keeps the path between the amplification unit and the third capacitor element in the conductive state to cause the third capacitor element to hold the amplified noise signal, is shorter than a period, in which the second switching unit keeps the path between the amplification unit and the second capacitor element in the conductive state to cause the second capacitor element to hold the first amplified signal.

4. The imaging device according to claim 3, further comprising a microlens that configured to guide light to the first and second photoelectric conversion units.

5. The imaging device according to claim 4, wherein
   the pixel cell includes L photoelectric conversion units, which include the first photoelectric conversion unit and second photoelectric conversion unit,
   the first signal is a signal based on electric charges obtained by adding electric charges accumulated respectively in M photoelectric conversion units out of the L photoelectric conversion units, where M is less than L,
   the second signal is a signal based on electric charges obtained by adding electric charges accumulated respectively in the L photoelectric conversion units, and
   the period, in which the switching unit keeps the path between the buffer unit and the capacitor element in the conductive state to cause the capacitor element to hold the first buffer signal, is M/L or less of the period, in which the switching unit keeps the path between the buffer unit and the capacitor element in the conductive state to cause the capacitor element to hold the second buffer signal.

6. The imaging device according to claim 2, further comprising a microlens configured to guide light to the first and second photoelectric conversion units.

7. The imaging device according to claim 2, wherein
   the pixel cell includes L photoelectric conversion units, which include the first photoelectric conversion unit and second photoelectric conversion unit,
   the first signal is a signal based on electric charges obtained by adding electric charges accumulated respectively in M photoelectric conversion units out of the L photoelectric conversion units, where M is less than L, the second signal is a signal based on electric charges obtained by adding electric charges accumulated respectively in the L photoelectric conversion units, and the period, in which the switching unit keeps the electrical path between the buffer unit and the capacitor element in the conductive state to cause the capacitor element to hold the first buffer signal, is M/L or less of the period, in which the switching unit keeps the electrical path between the buffer unit and the capacitor element in the conductive state to cause the capacitor element to hold the second buffer signal.

8. The imaging device according to claim 1, wherein the read-out circuit further includes a second capacitor element configured to hold the amplified signal and output the amplified signal to the buffer unit, and a second switching unit configured to switch the state of a path, between the amplification unit and the second capacitor element, between the conductive state and the non-conductive state, the second capacitor element is a capacitor element configured to hold the first amplified signal and hold the second amplified signal without resetting the first amplified signal, and a period, in which the second switching unit keeps the path between the amplification unit and the second capacitor element in the conductive state to cause the second capacitor element to hold the first amplified signal, is equal to or shorter than a period, in which the second switching unit keeps the path between the amplification unit and the second capacitor element in the conductive state to cause the second capacitor element to hold the second amplified signal.

9. The imaging device according to claim 8, wherein the read-out circuit further includes a third capacitor element configured to hold the amplified signal, and a third switching unit configured to switch a path, between the amplification unit and the third capacitor element, between the conductive state and the non-conductive state, the output unit further outputs a noise signal, the amplification unit outputs an amplified noise signal obtained by amplifying the noise signal, and a period, in which the third switching unit keeps the path between the amplification unit and the third capacitor element in the conductive state to cause the third capacitor element to hold the amplified noise signal, is shorter than a period, in which the second switching unit keeps the path between the amplification unit and the second capacitor element in the conductive state to cause the second capacitor element to hold the first amplified signal.

10. The imaging device according to claim 8, further comprising a microlens configured to guide light to the first and second photoelectric conversion units.

11. The imaging device according to claim 10, wherein the pixel cell includes L photoelectric conversion units, which include the first photoelectric conversion unit and second photoelectric conversion unit, the first signal is a signal based on electric charges obtained by adding electric charges accumulated respectively in M photoelectric conversion units out of the L photoelectric conversion units, where M is less than L, the second signal is a signal based on electric charges obtained by adding electric charges accumulated respectively in the L photoelectric conversion units, and the period, in which the switching unit keeps the path between the buffer unit and the capacitor element in the conductive state to cause the capacitor element to hold the first buffer signal, is M/L or less of the period, in which the switching unit keeps the path between the buffer unit and the capacitor element in the conductive state to cause the capacitor element to hold the second buffer signal.

12. The imaging device according to claim 8, wherein the pixel cell includes L photoelectric conversion units, which include the first photoelectric conversion unit and second photoelectric conversion unit, the first signal is a signal based on electric charges obtained by adding electric charges accumulated respectively in M photoelectric conversion units out of the L photoelectric conversion units, where M is less than L, the second signal is a signal based on electric charges obtained by adding electric charges accumulated respectively in the L photoelectric conversion units, and the period, in which the switching unit keeps the path between the buffer unit and the capacitor element in the conductive state to cause the capacitor element to hold the first buffer signal, is M/L or less of the period, in which the switching unit keeps the path between the buffer unit and the capacitor element in the conductive state to cause the capacitor element to hold the second buffer signal.

13. The imaging device according to claim 1, further comprising a microlens configured to guide light to the first and second photoelectric conversion units.

14. The imaging device according to claim 13, wherein the pixel cell includes L photoelectric conversion units, which include the first photoelectric conversion unit and second photoelectric conversion unit, the first signal is a signal based on electric charges obtained by adding electric charges accumulated respectively in M photoelectric conversion units out of the L photoelectric conversion units, where M is less than L, the second signal is a signal based on electric charges obtained by adding electric charges accumulated respectively in the L photoelectric conversion units, and the period, in which the switching unit keeps the path between the buffer unit and the capacitor element in the conductive state to cause the capacitor element to hold the first buffer signal, is M/L or less of the period, in which the switching unit keeps the path between the buffer unit and the capacitor element in the conductive state to cause the capacitor element to hold the second buffer signal.

15. The imaging device according to claim 1, wherein the pixel cell includes L photoelectric conversion units, which include the first photoelectric conversion unit and second photoelectric conversion unit, the first signal is a signal based on electric charges obtained by adding electric charges accumulated respectively in M photoelectric conversion units out of the L photoelectric conversion units, where M is less than L, the second signal is a signal based on electric charges obtained by adding electric charges accumulated respectively in the L photoelectric conversion units, and the period, in which the switching unit keeps the electrical path between the buffer unit and the capacitor element in the conductive state to cause the capacitor element to hold the first buffer signal, is M/L or less of the period, in which the switching unit keeps the electrical path between the buffer unit and the capacitor element in the conductive state to cause the capacitor element to hold the second buffer signal.

16. An imaging system comprising:

an imaging device; and an output signal processing unit configured to process a signal output from the imaging device, wherein the imaging device comprises:

a pixel cell including a first photoelectric conversion unit, a second photoelectric conversion unit, and an output unit; and a read-out circuit including an amplification unit and a buffer unit, the amplification unit configured to amplify a signal based on a signal output from the output unit, and to output an amplified signal to the buffer unit, and the buffer unit configured to buffer a signal output from the amplification unit, a capacitor element configured to hold a signal output from the buffer unit, and a switching unit configured to switch a state, between the buffer unit and the capacitor element, between a conductive state and a non-conductive state, wherein the output unit outputs the first signal based on electric charges accumulated in the first photoelectric conversion unit, the amplification unit outputs a first amplified signal obtained by amplifying a signal based on the first signal, and the buffer unit outputs a first buffer signal obtained by buffering a signal based on the first amplified signal, the output unit outputs a second signal based on electric charges obtained by adding electric charges accumulated in the first photoelectric conversion unit and electric charges accumulated in the second photoelectric conversion unit, the amplification unit outputs a second amplified signal obtained by amplifying a signal based on the second signal, and the buffer unit outputs a second buffer signal obtained by buffering a signal based on the second amplified signal, and a period, in which the switching unit keeps a path between the buffer unit and the capacitor element in the conductive state to cause the capacitor element to hold the first buffer signal, is shorter than a period, in which the switching unit keeps the electrical path between the buffer unit and the capacitor element in the conductive state to cause the capacitor element to hold the second buffer signal.

17. An imaging system comprising:

an imaging device; and an output signal processing unit to which a signal is input from the imaging device, wherein the imaging device comprises:

a pixel cell including a first photoelectric conversion unit, a second photoelectric conversion unit, and an output unit;

a microlens configured to guide light to the first and second photoelectric conversion units; and a read-out circuit including an amplification unit and a buffer unit, the amplification unit configured to amplify a signal based on a signal output from the output unit, and to output an amplified signal to the buffer unit, and the buffer unit configured to buffer a signal output from the amplification unit, a capacitor element configured to hold a signal output from the buffer unit, and a switching unit configured to switch a state, between the buffer unit and the capacitor element, between a conductive state and a non-conductive state, wherein the output unit outputs the first signal based on electric charges accumulated in the first photoelectric conversion unit, the amplification unit outputs a first amplified signal obtained by amplifying a signal based on the first signal, and the buffer unit outputs a first buffer signal obtained by buffering a signal based on the first amplified signal, the output unit outputs a second signal based on electric charges obtained by adding electric charges accumulated in the first photoelectric conversion unit and electric charges accumulated in the second photoelectric conversion unit, the amplification unit outputs a second amplified signal obtained by amplifying a signal based on the second signal, and the buffer unit outputs a second buffer signal obtained by buffering a signal based on the second amplified signal, and a period, in which the switching unit keeps a path between the buffer unit and the capacitor element in the conductive state to cause the capacitor element to hold the first buffer signal, is shorter than a period, in which the switching unit keeps the electrical path between the buffer unit and the capacitor element in the conductive state to cause the capacitor element to hold the second buffer signal, the output signal processing unit performs focus detection using a signal based on the first buffer signal and a difference signal between a signal based on the first buffer signal and a signal based on the second buffer signal, and the output signal processing unit generates an image using a signal based on the second buffer signal.

* * * * *